United States Patent [19]

Golston et al.

[11] Patent Number: 5,685,977

[45] Date of Patent: Nov. 11, 1997

[54] SWIMMING POOL FILTER COVER

[76] Inventors: Betty Carolyn Golston, 980 N. Avenida Venado, Tucson, Ariz. 85748; Morris Brown, 4510 S. Evergreen Ave., Tucson, Ariz. 85730

[21] Appl. No.: 718,174

[22] Filed: Sep. 19, 1996

[51] Int. Cl.⁶ .................................................. B65D 65/08
[52] U.S. Cl. ..................... 210/169; 210/232; 210/246; 150/154
[58] Field of Search ........................... 210/169, 232, 210/244, 246, 416.2; 150/154

[56] References Cited

U.S. PATENT DOCUMENTS

| 3,143,154 | 8/1964 | Best | 150/154 |
|---|---|---|---|
| 4,811,767 | 3/1989 | Kessler | 150/154 |
| 4,947,794 | 8/1990 | Baldwin | 150/154 |
| 5,097,678 | 3/1992 | Aubuchon | 150/154 |
| 5,318,821 | 6/1994 | Bradley, Jr. | 150/154 |
| 5,511,655 | 4/1996 | Porter | 150/154 |

*Primary Examiner*—Neil McCarthy
*Assistant Examiner*—Theodore M. Green
*Attorney, Agent, or Firm*—J. Michael McClanahan

[57] ABSTRACT

A swimming pool filter apparatus cover providing protection to a pool service technician servicing the filter apparatus, the cover forming a barrier between the technician and the filter apparatus. The filter apparatus is of the type having a central cylindrical body with upper and lower hemispherical portions, and an outwardly protruding flange base, with water inlet and outlet pipes intersecting the cylindrical body. A removable top cap which, when removed, reveals an entrance opening through the upper hemisphere. The technician extends his arm through this opening to remove contaminated sand or other filter material for replacement. The cover consists of a heavy flexible vinyl material having a rectangularly shaped main body to encircle the filter apparatus cylindrical body. This main body top peripherial edge joins a plurality of trapezoidal segments also joined together adapted to cover the upper hemispherical portion of the filter apparatus while providing a hexagonal opening for the top cap and entrance into the vessel. Further, openings for the inlet and outlet pipes are provided in the main body, which is closed with fastening materials. Alternate embodiments of the device provide for disposable type covers, and protection of the technician against threads in the filter apparatus top entrance.

18 Claims, 2 Drawing Sheets

SWIMMING POOL FILTER COVER

BACKGROUND OF THE INVENTION

1. Field of the Invention

The field of the invention is devices protecting people who may need to come in contact with the outside fiberglass surface of cylindrically shaped swimming pool filters against shed fiberglass particles which may enter the person's throat, skin and clothes. In addition, the field of the invention includes providing protection to the swimming pool filter against harsh elements of the environment such as sun, wind, rain, and the like which causes the breakdown or shedding of fiberglass particles.

2. Description of the Related Art

As owners of swimming pools know, in order to keep one's pool clean and sanitary, it is necessary that contaminates in the pool water need to be removed. Removal of these contaminates is usually accomplished by circulating the pool water through an exterior filter. Presently it is popular to use a sand type filter wherein water is forced through sand (or other filter material) which removes the contaminates. One especially popular filter comprises a rather large cylindrical shaped apparatus, commonly three feet high and two to two and one-half feet in diameter. The top and bottom of the filter are hemispherical in shape, connecting with the cylinder, and a base attaches to the bottom hemisphere to support the filter in an upright position. Filter medium such as sand is placed into the filter through an opening in the top hemispherical portion. This opening is generally five to six inches in diameter, threaded, and receives a likewise threaded top cap or bell which, when in place, seals the filter. Sand is placed into the pool filter apparatus through the opening in the top and removed through the same opening.

Water from the swimming pool is circulated to the filter by means of an inlet pipe and removed by an outlet pipe. These pipes are situated in the round cylindrical portion of the filter (although some filters have these pipes intersecting the top cap). Pool water is forceably pumped into the filter by means of a motor driven pump where it percolates through the sand and then is removed via the outlet pipe and returned to the swimming pool.

While placement of the sand into the swimming pool filter apparatus might be rather easy, removal of the sand generally is not. Presently, removal of the sand or other filter medium by a pool service technician is accomplished by first removing the top cap, and then reaching in to scoop up the sand and remove it from the filter through the top opening. This is a tedious job and requires that the service technician's body come in contact with the outside of the filter in order to reach sand situated in the bottom of the filter.

The difficulty encountered with these types of cylindrical shaped swimming pool filters is that they are constructed of fiberglass and, since the filters are typically located outside in the environment, they are subject to damage from the elements, particularly bright sunlight. Sunlight, together with rain, ice, and wind and other harsh conditions, tend to break down the outside surface of the fiberglass material, releasing minute fiberglass particles which have the potentiality of being toxic. The problem most readily experienced by swimming pool service technicians is that the fiberglass particles shed by the filter enter the clothes worn by the technician to abrade the technician's skin causing, at the very least, intense itching. It is common for technicians to wash their clothes multiple times to remove these fiberglass particles or, after a short usage of the clothes, to discard them. There may also be the risk of inhaling these shed fiberglass particles with the attendant damage.

Thus there becomes a need for protecting the swimming pool service technician from these minute fiberglass particles as they are shed by the pool filter apparatus. In addition, the invention, if left in place upon the swimming pool filter apparatus, protects the filter against the harsh elements of the environment which tend to break down the fiberglass material and ultimately shorten the life of the filter.

It is to this need firstly to protect the service technician against the shed fiberglass particles, and secondly, to protect the pool filter apparatus against the harsh elements of the environment, that this invention is directed.

SUMMARY OF THE INVENTION

The embodiment of the invention described consists of improvements to fiberglass constructed swimming pool filter apparatus which provides protection to a service technician when he is placing and removing the filtering medium, commonly sand, held by the filter apparatus. This protection extends to placing a barrier between the body of the technician and the fiberglass outside surface of the pool filter so that fiberglass particles shed by the filter apparatus does not enter the skin or throat of the service technician. In addition, the invention, in covering the pool filter apparatus, protects the filter against harsh environmental conditions detrimental to the apparatus.

More particularly, these improvements comprise a preferably heavy vinyl material cover adapted to encase the cylindrical type swimming pool filter apparatus that a service technician comes in contact with. This filter cover additionally permits the removal of the top cap or bell atop the upper hemisphere of the pool filter apparatus so that entrance to the interior of the filter apparatus is permitted through an opening revealed by removal of the top cap. Further, the cover is so constructed as to allow inlet and outlet pipes ingress and egress from the pool filter. Additionally, the inventive filter cover is so constructed such that it can be placed upon the filter apparatus or removed from the filter apparatus without disconnecting exterior pipe connections to the water pump which brings water from the pool and discharges filtered water back into the pool. Thus it is not necessary to separate the filter apparatus from operational status to install or remove the subject invention upon it.

The inventive filter apparatus covering device comprises a main body adapted to encircle the cylindrical portion of the filter apparatus, the main body comprising a rectangularly shaped flexible material in which openings have been formed to allow passage of the outwardly protruding inlet and outlet pipe. Further, the ends of the rectangularly shaped material have, on opposite sides, hook and loop type fastening material so that the main body of the invention is secured around the cylindrical portion of the filtering apparatus.

To the top edge of the rectangular shaped main body piece is attached by sewing or other adhesive means, a series of six generally trapezoidal shaped elements, these elements permitting the inventive cover to conform to the shape of the filter apparatus upper hemispherical shell. The longer base of each of the trapezoidal segments are attached to the top circumferential edge of the main body piece. In utilizing a generally trapezoidal shaped segment rather than a pie shaped segment, an opening is formed in the top portion of the cover when the smaller top portion of the generally trapezoidal shaped element are joined.

Alternate embodiments of the invention are disclosed which provide protection to the service technician's arm against the threaded opening in the top hemispherical portion of the filter apparatus. This protection comprises a neoprine or other type material hose which has been cut lengthwise wherein one of the formed lengthwise edges is attached to the short tops of the trapezoidal shaped pieces at the opening of the cover. The other lengthwise end of the neoprine hose extends down through the opening in the hemispherical shell to cup under the edge of the threaded opening. By this means, the service technician's arm is protected from coming in contact with the threads while he must necessarily reach into the interior of the filter apparatus.

Additional embodiments of the invention include a less expensive and more easily constructed cover which may be made of paper, thin plastic sheet material or other inexpensive materials, but which will provide some protection to the pool serviceman and against harsh elements in the environment. Generally these embodiments may be disposed of after just a few uses. In this additional embodiment, means are provided to completely enclose the filter apparatus through the use of a draw string situated at the bottom of the covering. Rather than form specific linking materials in the cover (to encapsulate the filter apparatus), the sides of the material may be held together by adhesive tape or like means in which case a thin pie shaped strip of the filter apparatus is left exposed together with the inlet and outlet pipes.

Accordingly, it is an object of the subject invention to provide means for protecting a swimming pool technician against minute fiberglass particles shed by the fiberglass shell of the swimming pool apparatus.

It is another object of the subject invention to provide a protective cover for a swimming pool filter apparatus against the harsh elements of an outside environment which might tend to degrade the structure of the filter apparatus.

It is still another object of the subject invention to provide in a protective cover means permitting access into the interior of the filter apparatus as is provided by the filter apparatus itself.

It is still further another object of the subject invention to provide means in the subject inventive cover to permit the ingress and egress of the inlet and outlet pipes connecting to the outside shell of the filtering apparatus.

Other objects of the invention will in part be obvious and will in part appear hereafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be had to the following detailed description taken in combination with the accompanying drawings wherein.

In various views, like index numbers referred to like elements.

DETAILED DESCRIPTION OF THE PREFERRED EMBODIMENT

Figure 1:
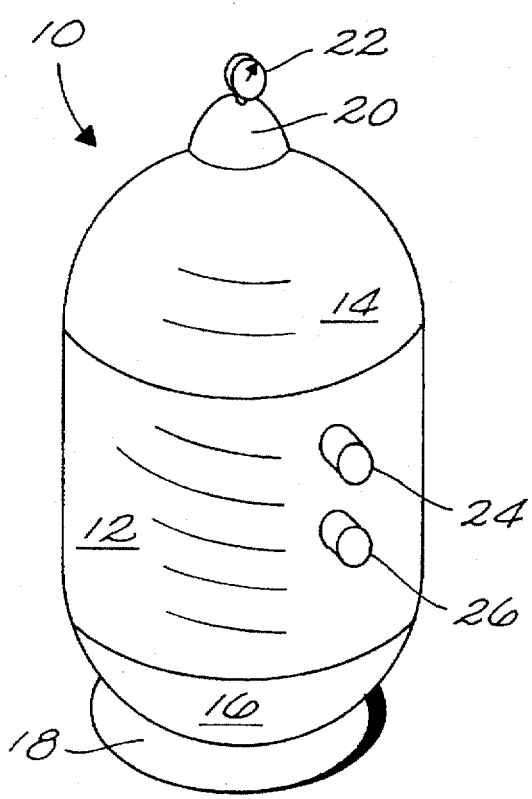
FIG. 1 is a perspective view of the usual cylindrical shaped swimming pool filter apparatus commonly found about swimming pools.

Referring now to FIG. 1, typical swimming pool filter apparatus 10 is shown in a perspective view. Filter 10 comprises three main elements, a cylindrical tank 12 and attaching hemispherical upper and lower portions, numerals 14 and 16 respectively. The cylinder and hemispherical upper and lower portions are usually constructed as one piece. An outwardly extending truncated cone shaped flange type base 18 is attached to hemispherical lower portion 16 for support upon a flat ground surface. At the very top of hemispherical upper portion 14 is a removable top cap or bell 20 which may have pressure gauge 22 attached to it. Intersecting cylindrical body 12 is protruding inlet pipe 24 and outlet pipe 26.

Interiorly to swimming pool filter apparatus 10 is sand or other type filter material. Water from the swimming pool is forceably pumped to filter apparatus 10 through inlet pipe 24 where it percolates through the filtering sand or other material. The filtered water exits filter apparatus 10 through outlet pipe 26 to be returned to the swimming pool.

The sand or other filter material which has become contaminated contained within pool filter apparatus 10 must be removed from time to time and new clean sand or other filtering material placed into the filter. This is accomplished through means of a threaded opening in hemispherical upper portion 14. Top cap or bell 20 is removably threaded into this opening where by unscrewing, access to the interior sand or other filter material is obtained.

Since pool filter apparatus 10 is in the range of three feet or so high and about two feet to two and one-half feet in diameter, the contained filtering material must be removed by a service technician reaching into the opening at the top of the hemispherical upper portion 14, scooping up handfuls of the filter medium, and taking it out through this opening, a rather tedious chore. In doing so, it generally requires the service technician to lay upon or across pool filter apparatus 10, especially to reach sand near the bottom of the container.

In most cases, swimming pool filter apparatus 10 is contructed as a fiberglass formed vessel which, after residing in the outside non-protected environment as well as receiving sunlight, tends to break down the outside layer of fiberglass construction. Fiberglass filament particles then begin to shed from the outside surface of the tank. These minute fiberglass particles will enter clothing worn by the service technician to severely irritate the technician's skin. In fact the shirt and pants worn by service technicians must be laundered multiple times to remove these fiberglass particles, and even in many times that is not sufficient. Once the fiberglass particles in the clothing have reached a high level, the clothing must be thrown away and replaced with new clothing. Further, there is the obvious danger of the service technician breathing in the fiberglass particles with their attendant damage.

Figure 2:
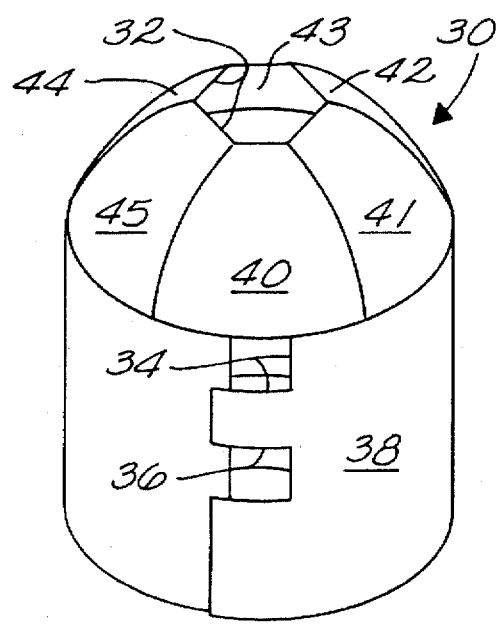
FIG. 2 is a perspective view of the inventive filter apparatus cover.

The present invention shown in FIG. 2 forms a protective barrier between the fiberglass shedding pool filter apparatus 10 and the service technician's clothes and ultimately, their body. More particularly, and referring to FIG. 2, a perspective view is shown of inventive swimming pool filter apparatus protective cover 30 which does provide the protection to the technician while servicing the filter apparatus. Cover 30 is constructed to generally conform to the upper three quarters of filter apparatus 10 and to provide openings for the three protrusions from the filter apparatus, namely top cap 20, and inlet and outlet pipes 24 and 26 respectively. Swimming pool filter cover 30 is preferably constructed from a heavy flexible vinyl material sewn together from individual pieces although other materials may obviously be utilized.

Cover 30 shown in FIG. 2 comprises as a main body a rectangularly shaped piece of flexible material 38 which completely encircles cylindrical body 12 of filter apparatus 10. In some cases, because flexible material 38 does not come in widths wide enough to totally encircle filter apparatus 10, rectangularly shaped main piece 38 may require the use of multiple rectangularly shaped pieces with an end of each piece joined together in order to be of sufficient length to completely encompass cylindrical body 12. The ends of rectangulary shaped piece 38 are adapted to join together by overlapping, preferably by using a hook and loop type fastening material (not shown). Further, openings are cut from one end of rectangulary shaped piece 38 to accommodate the inlet and outlet pipes 24 and 26 respectively (FIG. 1). The openings formed at one end of the rectangularly shaped piece 38 are illustrated in FIG. 2 as openings 34 and 36.

The dome shaped hemispherical upper portion of cover 30 is formed from preferably six generally shaped trapezoidal pieces or segments made of the same heavy flexible vinyl material. These trapezoidal segments are shown as numerals 40, 41, 42, 43, 44, and 45. The longer base portion of trapezoidal shaped elements or segments 40-45 are attached to the top edge periphery of rectangularly shaped flexible material piece 38 by sewing or other appropriate methods. Then, opposite vertical sides of trapezoidal shaped material segments 40-45 are also joined to the adjacent trapezoidal shaped segment sides by sewing or other appropriate methods to complete the formation of the domed shaped hemisphere of cover 30. At the very top of this domed shaped hemisphere of cover 30 is hexagonal opening 32, adapted to encircle the base of top cap or bell 20 on swimming pool filter apparatus 10.

Figure 3:
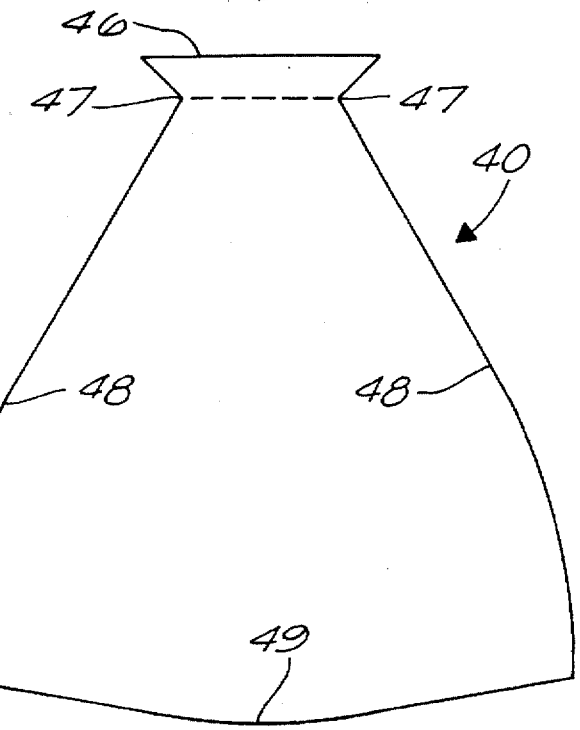
FIG. 3 is a top plan view of an enlarged segment of the inventive cover adapted to enclose a portion of the upper hemisphere of the filtering apparatus.

Referring now to FIG. 3, a top plan view of generally trapezoidal shaped segment 40 (which is identical to the other segments 41-45) is shown. As is seen, the bottom edge 49 of trapezoidal shaped segment 40 is slightly rounded for attachment to the top peripherial edge of rectangularly shaped flexible material piece 38. Similarly, opposite vertical sides 48 of trapezoidal shaped segment 40 are similarly cut so that when all trapezoidal segments 40-45 are lapped over and sewn together at sides 48, a fitted hemispherical top of cover 30 is formed. At the very top of trapezoidal segment 40 is top edge 46. Top edge 46 is flat, however it is folded under along a crease line between opposite points 47 and then sewn to the underside of segment 40. Thus, top opening 32 shown in FIG. 2 will be hexagonal in shape for six segments. Of course, fewer or more segments may be employed in which case the top opening 32 will reflect such number of segments, or top opening 32 could be circular in shape.

Figure 4:
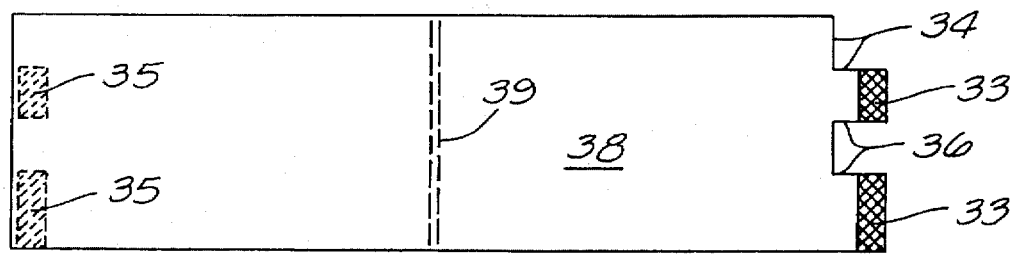
FIG. 4 is a top plan view of the main body of the subject cover.

Referring now to FIG. 4, rectangularly shaped flexible material piece 38 is shown in a top plan view laid out flat to show placement of the hook and loop material fasteners and the openings or notches 34 and 36 formed for accommodation of the inlet and outlet pipes. As referenced earlier, material piece 38 is rather elongated and may comprise one or more pieces of material sewed together if the material cannot be purchased in lengths sufficient to be one piece. This sew line is shown in dotted fashion by line 39.

At opposite ends of rectangular shaped material piece 38 are the hook and loop fastening material. More particularly, hook fastening material 33 is shown at one end of piece 38 with loop fastening material 35 at the other end. Loop fastening material 35 is shown in dotted fashion since it is on the under side of material piece 38 from hook fastening material 33. The location of the hook and loop fastening material is oriented such that when cover 38 is installed on filter apparatus 10, the loop and hook fastening materials align for mating. Of course, the hook and loop fastening materials may be interchanged, as well as other fastening methods used, such as snaps or an adhesive.

Finally, the invention is constructed by attaching, such as by sewing, the bottom rounded base 49 of the six trapezoidal segments 40-45 to the top edge of rectangularly shaped piece 38. This completes construction of the cover.

Installation of cover 30 on pool filter apparatus 10 is quite simple and straight forward. Firstly, cover 30 is so oriented that the openings 34 and 36 encircle inlet and outlet pipes 24 and 26. The fact that the end flap of piece 38 (with openings 34 and 36) may be swung out from its attachment point at the joinder with segment 40 is helpful in installation. The flap end of rectangular piece 38 is not closed until cover 30 is fully situated upon pool filter 10 with inlet and outlet pipes 24 and 26 emerging through openings 34 and 36 respectively. Then the flap at the end of the rectangular piece 38 is joined to the opposite end of rectangular piece 38 utilizing the hook and loop fastening material.

Once cover 30 has been installed, the service technician may now remove top cap 20 protruding through the hexagonal opening of cover 30. Once top cap 20 is removed, the opening into filter apparatus 10 is exposed and the technician may reach into the filter to remove by hand the sand or other filtering materials. The technician need not be concerned about his clothes or exposed portions of his body coming in contact with the fiberglass container comprising pool filter apparatus 10 since the inventive cover 30 shields all parts of filter apparatus 10 that he might engage.

Proceeding onward, the construction of inventive cover 30 suggests a number of alternate embodiments which provide improvements to the basic design and construction of the filter cover and some of these improvements are shown in FIGS. 5-9.

Figure 5:
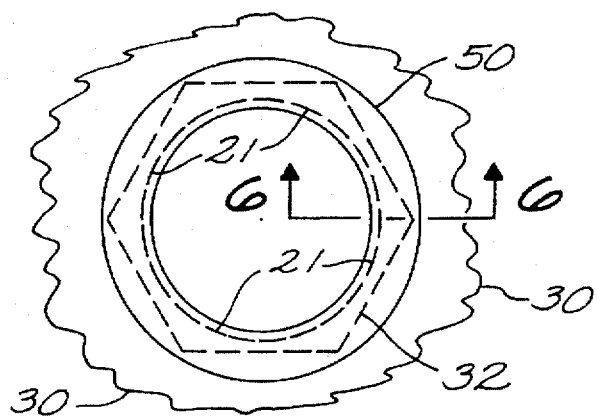
FIG. 5 is a top plan view showing the invention in a partial view with an alternate embodiment of the invention disclosed.

More particularly, FIG. 5 shows in a top view a portion of inventive cover 30 in place over pool filter apparatus 10 with the top threaded opening 21 exposed, top cap 20 already removed. Protective sleeve 50 is detailed attached to cover 30 at its top opening 32. Protective sleeve 50 in the preferred embodiment is a piece of neoprene or other type plastic hose which has been cut lengthwise and attached to protective cover 30 proximate its opening 32. Protective sleeve 50 is designed to completely encompass the threaded opening 21 in pool filter apparatus 10 so that the service technician's arms do not contact these threads which may cause abrasion to his arms and hands.

Figure 6:
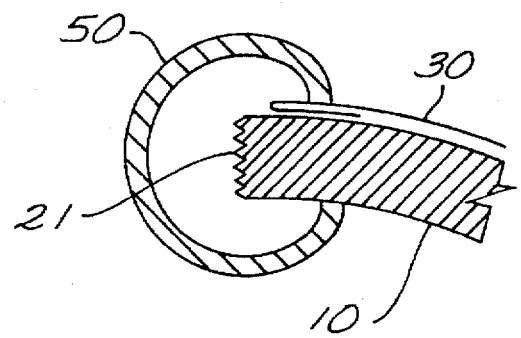
FIG. 6 is a sectional view of the alternate embodiment of the invention taken through the opening in the filter apparatus.

Shown in FIG. 6 is a cross sectional view of protective sleeve 50 taken through sectional line 6—6 encompassing the threads of pool filter opening 21. Protective sleeve 50 is attached to the top opening of cover 30 along one of the sleeve's lengthwise sides with the other lengthwise side entering into the opening at the top of filter apparatus 10 and engaging the inside surface of filter apparatus 10.

Figure 7:
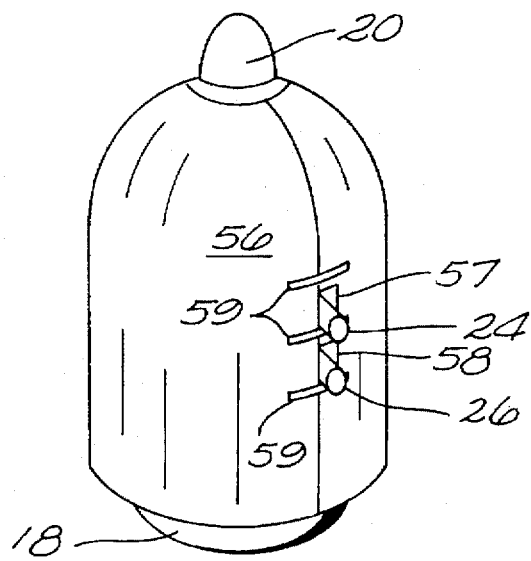
FIG. 7 is a perspective view of a second alternate embodiment of the invention in place covering the filter apparatus.
Figure 8:
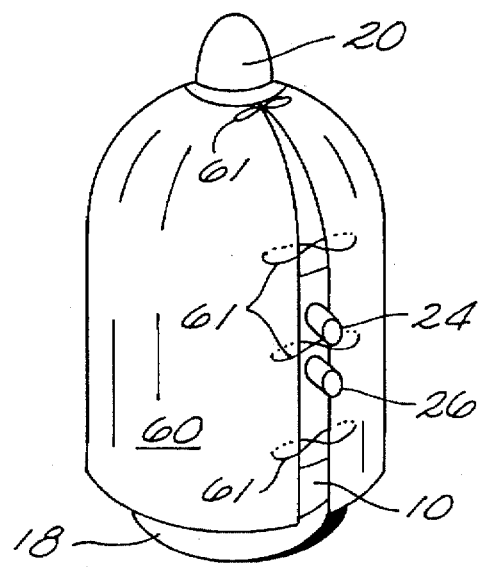
FIG. 8 is a perspective view of another alternate embodiment of the subject invention covering the filter apparatus.
Figure 9:
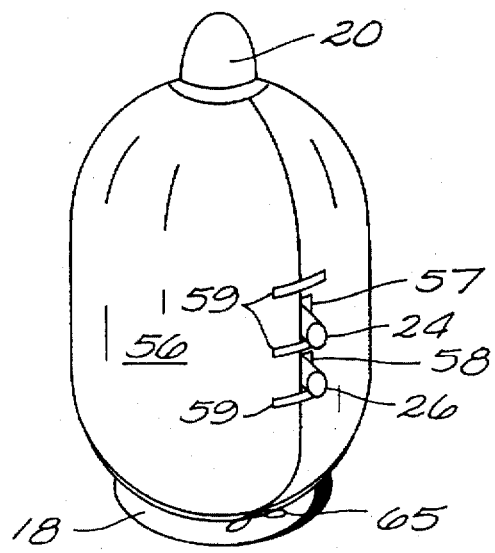
FIG. 9 is a perspective view of another alternate embodiment of the subject invention.

FIGS. 7 through 9 show still other alternate embodiments of the inventive cover which in these drawings may be constructed from a light weight plastic, fabric, or paper material, not necessarily designed for long life or long term protection of the service technician against contact with the fiberglass container forming filter apparatus 10. These alternate embodiments also serve to protect the fiberglass construction of filter apparatus 10 from the effects of weather and sunlight.

More particularly, FIG. 7 shows cover 56 draped over pool filter 10, the cover constituting a single piece of material which has an opening formed at the top for emergence of top cap 20. In addition, along the joinder line of opposite sides of cover 56 as it wraps around pool filter apparatus 10, are notches 57 and 58 permitting inlet and outlet pipes 24 and 26 to emerge. Holding the sides together are multiple pieces of adhesive tape 59. Base 18 of pool filter apparatus 10 is shown protruding from wraparound cover 56.

FIG. 8 shows another alternate embodiment of the invention where a light weight plastic, fabric, or paper material cover 60, similar in many fashions to cover 56, shown. Cover 60 is not quite as elaborate as cover 56 in that special provisions are not made for inlet and outlet pipes 24 and 26. Here, the two sides of the wrap around cover 60 do not overlap but are held open around the inlet and outlet pipe 24 and 26 respectively, tied together with pieces of string 61. Obviously, a narrow pie shaped portion of filter apparatus 10 is revealed.

In FIG. 9, cover 56 shown in FIG. 7 has been gathered together at its bottom with draw string 65 which engages filter apparatus 10 at its connection with base 18.

Figure 10:
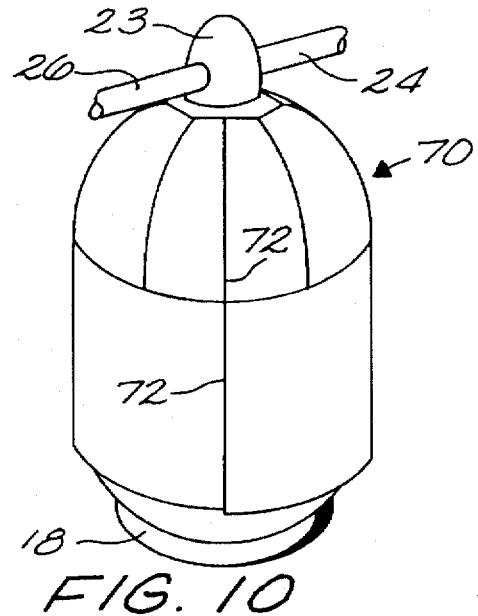
FIG. 10 is a perspective view of still another alternate embodiment of the subject invention applied to a filter which has inlet and outlet pipes emerging from the top cap.

Lastly, FIG. 10 shows a further alternate embodiment wherein the inlet and outlet pipes 24 and 26 intersect top cap 23. In this embodiment, no provision is made for openings in the cylindrical side of cover 70 for the inlet and outlet pipes, and cover 70 wraps totally around and is closed by loop and hook fastening means (not shown) at edge 72 which traverses both the upper hemispherical portion and cylindrical portion of cover 70.

While the invention has been described, disclosed, illustrated, and shown in certain terms or certain embodiments or modifications which it has assumed in practice, the scope of the invention is not intended to be, nor should it be, deemed to be limited thereby and such other modifications or embodiments as may be suggested by the teachings herein are particularly reserved, especially as they fall within the breath and the scope of the claims here appended.

We claim:

1. A protective cover for a swimming pool filter apparatus of the type constructed of fiberglass having a central cylindrical body with upper and lower hemispherical portions, a water inlet pipe and outlet pipe connected to the filter apparatus, a threaded opening in the upper hemispherical portion, and a top cap removably attached to the threaded opening in the upper hemispherical portion, which top cap, when removed, provides entrance by a pool service technician into the interior of the filter apparatus through the threaded opening for placement and removal of contained filter medium, said protective cover forming a barrier between the technician and the fiberglass filter apparatus when the technician must service the filter apparatus, said cover comprising:

a rectangularly shaped main body to encircle the filter apparatus cylindrical body; and a plurality of substantially trapezoidal shaped segments operably attached to said main body, said trapezoidal segments also operably joined together to cover the upper hemispherical portion of the filter apparatus, and said trapezoidal shaped segments forming an opening through which the filter apparatus top cap protrudes, said cover providing a protective barrier between the filter apparatus and the pool service technician against offensive fiberglass filament particles shed by the fiberglass at times when the technician removes and replaces the filter medium through the top cap opening in the filter apparatus.

2. The protective cover for swimming pool filter apparatus as defined in claim 1 including fastening means attached to said rectangularly shaped main body, said fastening means securing the rectangularly shaped main body around the filter apparatus cylindrical body.

3. The protective cover for swimming pool filter apparatus as defined in claim 2 wherein said rectangularly shaped main body defines a first end and a second end, said first end and second end adapted to overlap when said rectangular main body encircles the filter apparatus cylindrical body, and said fastening means is operably attached to each of said first end and second end, said fastening means engaging and holding said overlapping first end to said second end of said rectangularly shaped main body around the filter apparatus cylindrical body.

4. The protective cover for swimming pool filter apparatus as defined in claim 3 wherein the water inlet pipe and outlet pipe each connect to the filter apparatus central cylindrical body, and said rectangularly shaped main body includes at least one opening, said opening allowing the ingress and egress of the water inlet pipe and outlet pipe.

5. The protective cover for swimming pool filter apparatus as defined in claim 4 wherein said opening for the water inlet pipe and outlet pipe is formed in said first end of said rectangularly shaped main body, said opening comprising a notch formed in said end of said rectangularly shaped main body.

6. The protective cover for swimming pool filter apparatus as defined in claim 3 wherein the water inlet and outlet pipe each connect to the filter apparatus central cylindrical body, and said rectangularly shaped main body further includes a first and second opening in said rectangularly shaped main body, said first opening allowing the protuberance of the inlet pipe, and said second opening allowing the protuberance of the outlet pipe.

7. The protective cover for swimming pool filter apparatus as defined in claim 6 wherein said substantially trapezoidal shaped segments define six substantially trapezoidal shaped segments, said trapezoidal shaped segments defining a hexagonal shaped opening around the top cap.

8. The protective cover for swimming pool filter apparatus as defined in claim 7 wherein said rectangularly shaped main body, and said substantially trapezoidal shaped segments, define flexible plastic material.

9. The protective cover for swimming pool filter apparatus as defined in claim 3 including a protective sleeve operably attached to said opening defined by said substantially trapezoidal shaped segments, said protective sleeve circumferentially engaging the threads in the upper hemispherical opening of the filter apparatus.

10. The protective cover for swimming pool filter apparatus as defined in claim 3 wherein said fastening means comprise hook and loop type fastening materials.

11. The protective cover for swimming pool filter apparatus as defined in claim 1 including fastening means, and wherein said rectangularly shaped main body defines a first end and a second end, said fastening means operably attached to said first end and said second end, said first end and second end overlapping and fastening to each other as said rectangularly shaped main body encircles the filter apparatus cylindrical body; and one of said plurality of substantially trapezoidal shaped segments operably attached to said rectangularly shaped main body defines two pieces, a first piece and a second piece, said first piece having a first end and said second piece having a second end, said first and second end overlapping, said first and second end also having said fastening means, said trapezoidal upper segment first piece first end in alignment with said rectangularly shaped main body first end and said trapezoidal upper segment second piece second end in alignment with said rectangularly shaped main body second end whereby said protective cover is installed on the swimming pool filter apparatus by separating said rectangularly shaped main body and said trapezoidal shaped upper segment first end from the second end, and then bringing said first end to said second end to fasten and thereby completely encircle the pool filter apparatus.

12. A protective cover for a swimming pool filter apparatus of the type constructed of fiberglass having a central cylindrical body with upper and lower hemispherical portions, a water inlet pipe and outlet pipe connected to the filter apparatus, a threaded opening in the upper hemispherical portion, and a top cap removably attached to the threaded opening in the upper hemispherical portion, which top cap, when removed, provides entrance by a pool service technician into the interior of the filter apparatus through the threaded opening for placement and removal of contained filter medium, said protective cover forming a barrier between the technician and the fiberglass filter apparatus when the technician must service the filter apparatus, said cover comprising:

a rectangularly shaped main body to encircle the filter apparatus cylindrical body, said rectangularly shaped body having a top edge and a bottom edge, said top edge gathered such that the rectangularly shaped main body forms substantially a trapezoidal body, said gathered top forming an opening through which the filter top cap protrudes, said cover providing a protective barrier between the filter apparatus and the pool service technician against offensive fiberglass filament particles shed by the fiberglass at times when the technician removes and replaces the filter medium through the top cap opening in the filter apparatus.

13. The protective cover for swimming pool filter apparatus as defined in claim 12 including fastening means operably attached to said rectangulary shaped main body, said fastening means securing the rectangulary shaped main body around the filter apparatus cylindical body.

14. The protective cover for swimming pool filter apparatus as defined in claim 13 wherein said rectangularly shaped main body defines a first end and a second end, said first end and second end overlapping as said rectangulary shaped main body encircles the filter apparatus cylindrical body, and said fastening means is operably attached to each of said first end and said second end, said fastening means engaging and holding said overlapping first end to said second end of said rectangulary shaped main body around the filter apparatus cylindrical body.

15. The protective cover for swimming pool filter apparatus as defined in claim 14 wherein the water inlet pipe and water outlet pipe each connect to the filter apparatus central cylindical body, and further including at least one notch formed in said rectangularly shaped main body first end, said opening allowing the ingress and egress of the water inlet pipe and outlet pipe.

16. The protective cover for swimming pool filter apparatus as defined in claim 15 wherein said notch formed in said rectangularly shaped main body includes a first notch and a second notch formed in said first end of rectangularly shaped main body, said first opening allowing the ingress of the inlet pipe and said second opening allowing the egress of the outlet pipe.

17. The protective cover for swimming pool apparatus as defined in claim 13 wherein said rectangularly shaped main body includes a first end and second end, said fastening means operably attached to said first end and to said second end, said fastening means holding said rectangularly shaped main body around the filter apparatus central cylindrical body.

18. The protective cover for swimming pool apparatus as defined in claim 12 further including a draw string operably attached to said rectangularly shaped main body bottom edge, said draw string pulling said bottom edge of said protective cover to the lower hemispherical portion of the filter apparatus.

* * * * *